(12) United States Patent
Klaffenbach et al.

(10) Patent No.: US 7,756,681 B2
(45) Date of Patent: *Jul. 13, 2010

(54) POWER SUPPLY CIRCUIT

(75) Inventors: David K. Klaffenbach, Battle Ground, WA (US); Michael J. Campin, Battle Ground, WA (US); Algird M. Gudaitis, Vancouver, WA (US); Chadwick W. Stryker, Ridgefield, WA (US); Jon S. Boehm, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 740 days.

This patent is subject to a terminal disclaimer.

(21) Appl. No.: 11/077,873

(22) Filed: Mar. 10, 2005

(65) Prior Publication Data
US 2006/0217931 A1    Sep. 28, 2006

(51) Int. Cl.
*G06F 17/40*    (2006.01)
(52) U.S. Cl. .................. 702/187; 323/283; 713/320
(58) Field of Classification Search ............ 702/57, 702/58, 65, 79, 125, 187; 315/82; 361/93.7, 361/98; 363/16, 21.12; 323/222, 283; 324/133; 327/165; 714/22; 379/102.04; 307/150; 713/300, 320
See application file for complete search history.

(56) References Cited

U.S. PATENT DOCUMENTS

| | | | |
|---|---|---|---|
| 4,229,665 A * | 10/1980 | Tiedt | 307/150 |
| 5,552,694 A | 9/1996 | Appeltans | |
| 5,568,607 A * | 10/1996 | Ishikawa et al. | 714/22 |
| 5,745,351 A | 4/1998 | Taurand | |
| 5,894,508 A * | 4/1999 | Kim | 379/102.04 |
| 6,058,026 A | 5/2000 | Rozman | |
| 6,199,969 B1 | 3/2001 | Haflinger et al. | |
| 6,330,169 B2 | 12/2001 | Mullett et al. | |
| 6,565,177 B1 | 5/2003 | Corrigan, III | |
| 6,606,257 B2 | 8/2003 | Bourdillon | |
| 6,660,257 B1 | 12/2003 | McWherter et al. | |
| 6,748,546 B1 * | 6/2004 | Mirov et al. | 713/320 |
| 6,956,360 B2 * | 10/2005 | Matsuura et al. | 323/283 |
| 6,960,904 B2 * | 11/2005 | Matsuura et al. | 323/283 |

OTHER PUBLICATIONS

"Power Failure Detection Signal Apparatus of DC Stabilized Power Supply", Kobayashi (JP402218967A), abstract, Pubn Date: Aug. 31, 1990.*

* cited by examiner

*Primary Examiner*—John H Le (57) ABSTRACT

Embodiments of power supply circuits are disclosed in which a filter function is performed on a count value from a counter that counts the number of times of enabling of a power supply circuit.

32 Claims, 10 Drawing Sheets

POWER SUPPLY CIRCUIT

BACKGROUND

Many electronic devices make use of switching power supplies. Devices that may use switching power supplies include cell phones, personal computers, notebook computers, personal digital assistants, and a host of other device types. Among the various devices that may use switching power supplies are inkjet printers. Compliance with infrastructure or regulatory power usage limits and detection of malfunctions can be difficult for devices using switching power supplies without the capability to measure the power delivered.

BRIEF DESCRIPTION OF THE DRAWINGS

The claimed subject matter will be understood more fully from the detailed description given below and from the accompanying drawings of embodiments which should not be taken to limit claimed subject matter to the specific embodiments described, but are for explanation and understanding of the disclosure.

DETAILED DESCRIPTION

Figure 1:
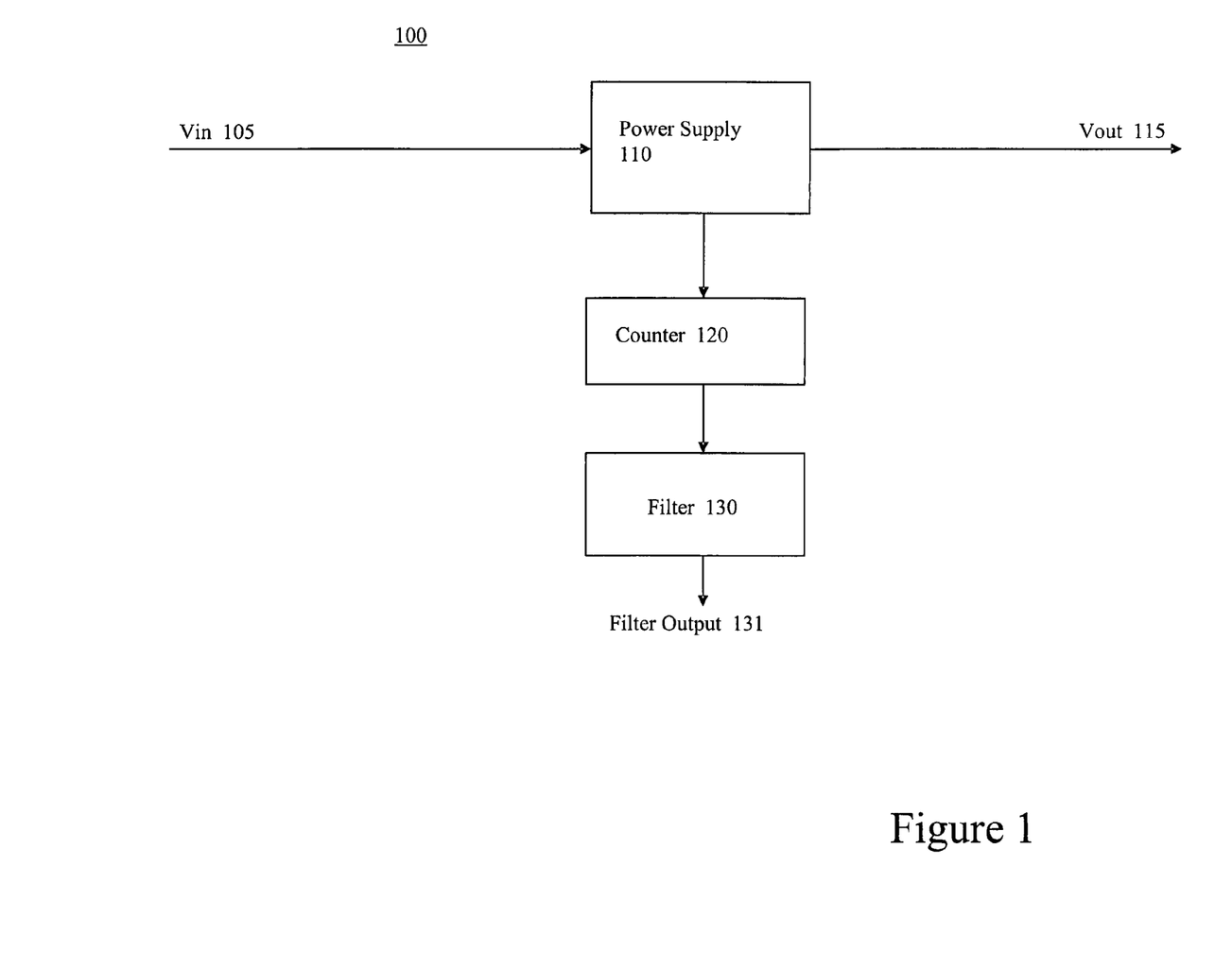
FIG. 1 is a block diagram of one embodiment of an example system.

FIG. 1 is a block diagram of an embodiment of an example system 100 including a power supply 110 and a counter 120. Counter 120 may track how many times power supply 110 is enabled over a period of time. Results from counter 120 may be received by a filter 130. Filter 130 may perform any of a variety of functions, including, but not limited to, FIR (finite impulse response) and IIR (infinite impulse response) filter functions. One example of an FIR may be a rolling average of counter values where the counter values represent power consumption. Other embodiments are possible using other FIR and/or IIR filter functions. Filter output 131 may be delivered to a processor or other circuitry to enable a variety of functions including, but not limited to, shutting down the power supply when appropriate.

Figure 2:
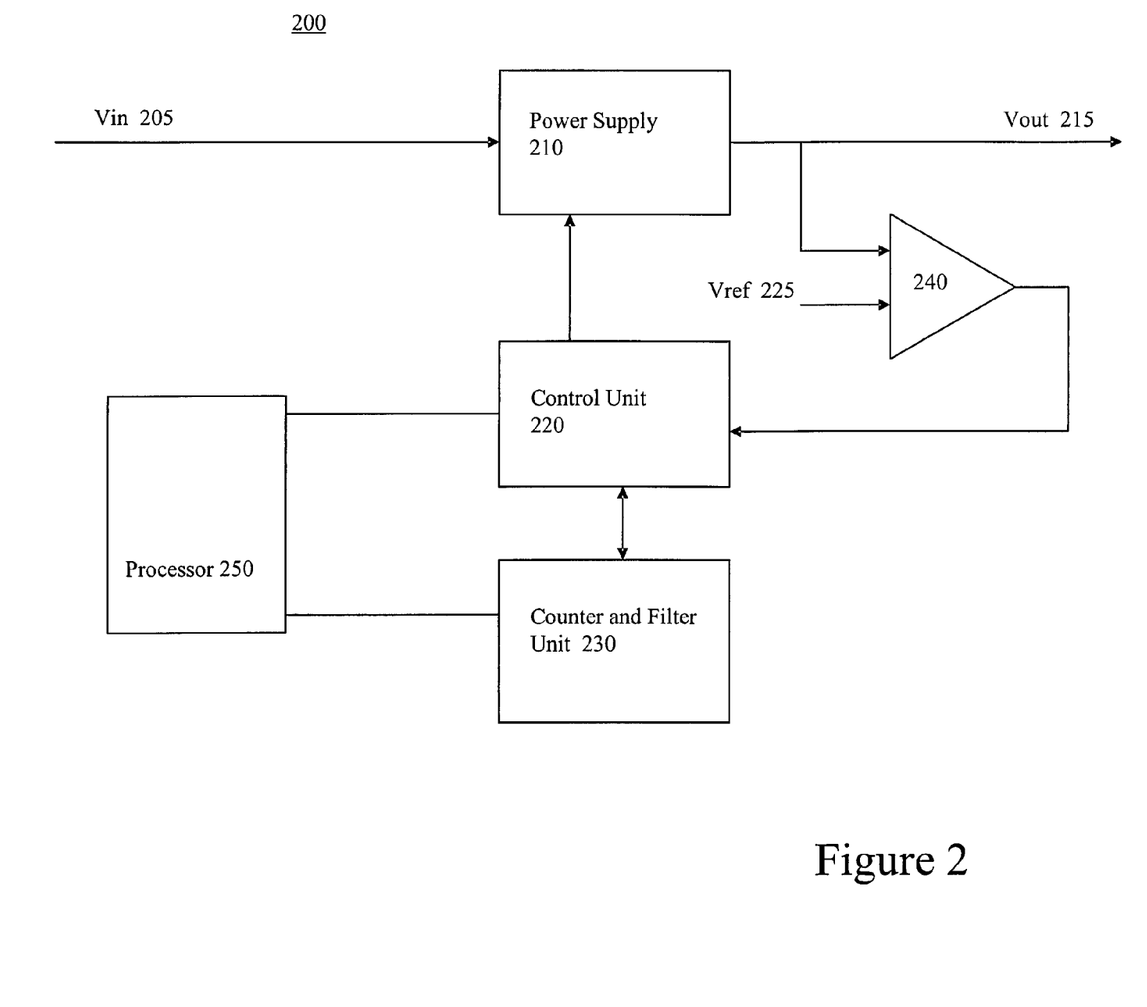
FIG. 2 is a block diagram of one embodiment of an example system.

FIG. 2 is a block diagram of an embodiment of an example system 200 including a power supply 210 and a control unit 220. Control unit 220 for this example operates according to a fixed frequency clock, although other embodiments may use a variable frequency clock. Control unit 220 controls on a cycle-by-cycle basis whether the power supply 210 transfers additional energy to a Vout signal 215. Vout 215 is coupled to a comparator 240 which compares the voltage level on Vout 215 with a reference voltage Vref 225. The output of comparator 240 is coupled to control unit 220. Control unit 220 uses the input from comparator 240 to determine, at least in part, whether to cause power supply 210 to transfer additional power. This determination is made on a cycle-by-cycle basis. That is, for each cycle, control unit 220 decides whether to enable power supply 210 for a portion of that clock period. The amount of time during the clock period that the power supply is enabled may be referred to as an "on time." In one embodiment, for each clock cycle, if the voltage level on Vout 215 is greater than Vref, then control unit 220 does not enable power supply 210. Also for each clock cycle, if the voltage level on Vout is less that Vref, then control unit 220 enables power supply 210. This behavior may be modified by signals from processor 250 or counter and filter unit 230.

For this example embodiment, power supply 210 may be a switching supply. Switching power supplies may, in general, operate in either continuous conduction mode or discontinuous conduction mode. For this example embodiment, power supply 210 may operate in discontinuous conduction mode. Discontinuous conduction mode is discussed further below in connection with FIG. 4.

System 200 also includes a counter and filter unit 230. Counter and filter unit 230 may include one or more counters for counting the number of times over a period of time control unit 220 enables power supply 210. For this example embodiment, because the clock frequency is closely controlled so that it is substantially constant and because power supply 210 operates in discontinuous conduction mode, if at least an approximate value for Vin is available and if the "on time" is approximately constant, then the number of times that power supply 210 is enabled over a period of time can be used to determine the approximate amount of power that has been transferred by power supply 210 to the Vout node during that period of time. Under these conditions, the count value is proportional to the actual amount of power transferred.

Other embodiments are possible. For example, enabling the power supply could be based on the output current level instead of voltage level.

Although this embodiment discusses counting the number of times the power supply is enabled over a set period of time, other embodiments are possible where a timer is used to determine how long it takes for the power supply to be enabled a set number of times. For these various embodiments, the set time period or the set number of power supply enablings can be programmable. For embodiments that count the number of times a power supply is enabled over a set period of time, greater measurement accuracy may be achieved by increasing the time period. For embodiments that determine how long it takes for a power supply to be enabled a set number of times, accuracy may be increased by increasing the set number of times the power supply is enabled.

Counter and filter unit 230 may include a register to hold a count value that can be accessed by a processor 250. Various software or firmware operations may be performed using the count value to make determinations and perform operations related to power output and power measurement.

For one embodiment, counter and filter unit 230 may perform the function of averaging a number of count values and comparing the average with a limit threshold. In one embodiment, if the average exceeds the limit threshold, the counter and filter unit 230 may signal the control unit 220 to disable the power supply. In another embodiment, the limit comparison may be performed by processor 250.

Another possible embodiment for filtering count results within counter and filter unit 230 or with other circuitry or with a software agent includes implementing an IIR filter function according to the following equation:

Output(n)=(Output(n−1)*(Divider−1)/Divider)+(Input(n)*1/Divider)

where Output(n) represents an output value and Output(n−1) represents a previous output value. Input(n) represents a count value. For this example embodiment, the Divider value is 16, although other embodiments may use other values. For this example, to get the output value (Output(n)), $^{15}/_{16}$ of the previous output value (Output(n−1)) is added to $^{1}/_{16}$ of the count value (Input(n)). This example embodiment may be considered to be an IIR because the output depends on a previous output.

The above equation may be re-written as follows:

Output(n)=Output(n−1)−Output(n−1)/Divider+Input(n)/Divider.

If the Divider value is a power of two, then the division operations may be accomplished using simple shift operations.

The above IIR filter function may be considered an approximate equivalent of an RC low pass filter where the roll off frequency is a function of the Divider value.

Figure 3:
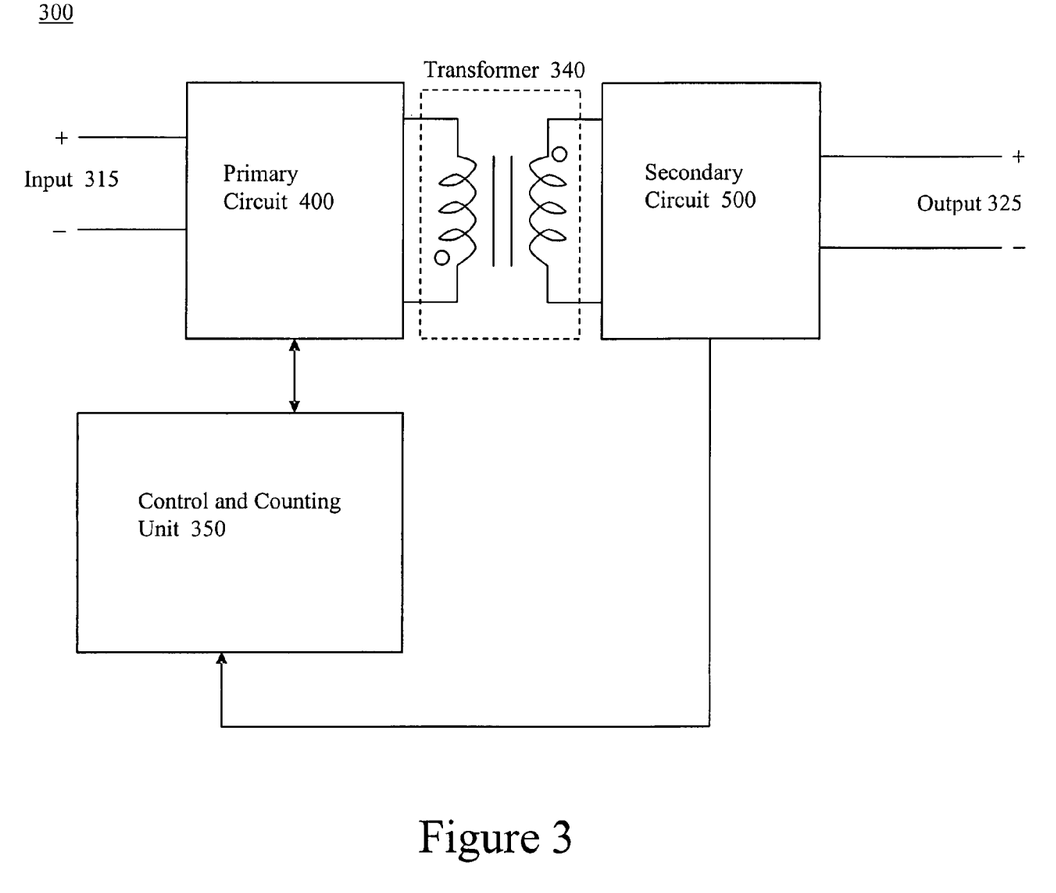
FIG. 3 is a block diagram of an embodiment of an example power supply circuit.

FIG. 3 is a block diagram of an embodiment of an example power supply circuit 300. Power supply 300 includes a primary circuit 400. Primary circuit 400 receives an input voltage at input 315. Power supply 300 also includes a secondary circuit 500. Secondary circuit 500 provides output 325, which may be coupled to a load (not shown).

Primary circuit 400 is coupled to secondary circuit 500 through a transformer 340. The primary side windings of transformer 340 are wound with a polarity opposite that of the secondary side.

Power supply 300 further includes a control and counting unit 350 that is coupled to primary circuit 400 and secondary circuit 500. A more thorough discussion of the operation of the various units of power supply 300 follows below.

Figure 4:
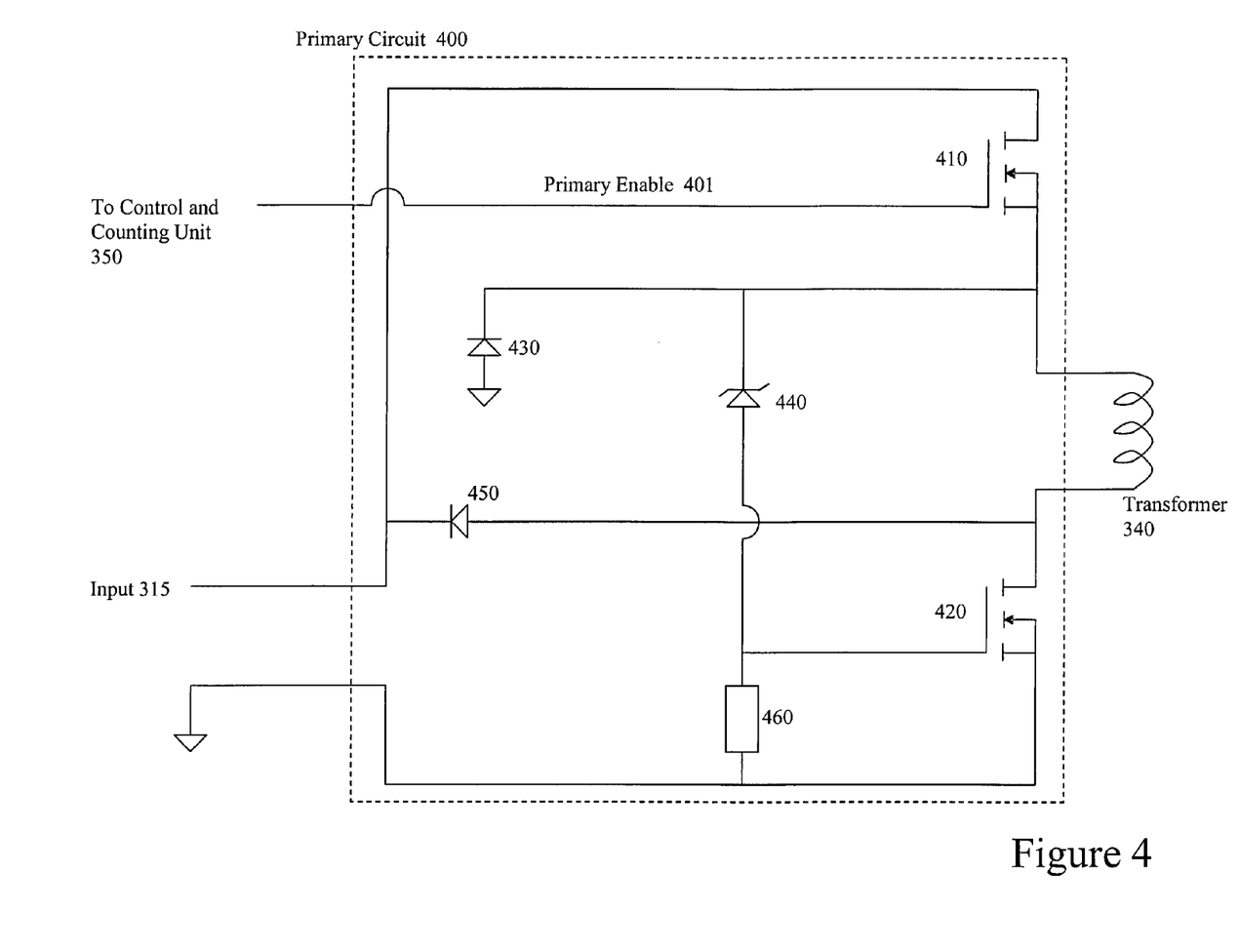
FIG. 4 is a block diagram of an embodiment of a primary circuit that may be used in connection with the example power supply embodiment of FIG. 3.

FIG. 4 is a block diagram of an embodiment of a primary circuit 400 that may be used in connection with the example power supply embodiment of FIG. 3. Primary circuit 400 includes a switch 410 and a switch 420, which for this example are MOSFETs.

When control and counting unit 350 asserts a primary enable signal 401, switch 410 turns on and the input voltage from input 315 is applied to the upper part of the primary side of transformer 340. For this example embodiment, the input voltage is approximately 52V. The input voltage is also applied to the cathodes of a diode 430 and a zener diode 440. In this condition, diode 430 is reverse biased so substantially no current flows through it. For this example embodiment, the zener voltage for zener diode 440 is 39V. Because the input voltage of 52V, is greater than the zener voltage of 39V, a 13V (52V−39V) signal is seen at the anode of zener diode 440, which is coupled to resistor 460 and a switch 420, rapidly charging the switch's gate capacitance. The voltage applied to switch 420 causes switch 420 to turn on, allowing current to flow through the primary of transformer 340. While switch 410 is on but before switch 420 has turned on, diode 450 has zero volts across it so no current flows. After switch 420 turns on, diode 450 is reverse biased by 52V, maintaining the substantially zero current state of diode 450.

When primary enable signal 401 is deasserted, switch 410 stops conducting and the voltage applied to the primary of transformer 340 begins to fall rapidly due to the inductive kickback of the primary of transformer 340. Once this voltage falls slightly below 52V, zener diode 440 stops conducting and the gate capacitance of MOSFET 420 begins to discharge through resistor 460. Initially, this discharge is slow but once the transformer drives the voltage on the cathode of zener diode 440 below the gate voltage of switch 420, zener diode 440 becomes forward biased and quickly drags the gate voltage of switch 420 to 0V thereby turning switch 420 off. Thus a portion of the energy stored in transformer 340 is actually used to turn off switch 420 very quickly. Diode 430 clamps the voltage at the node joining the cathode of diode 430 and transformer 340 so that it will not fall more than a diode voltage drop below ground. Once switch 420 has turned off, the voltage at the node joining the anode of diode 450 with switch 420 and with the lower part of the primary transformer 340 begins to rise quickly until it gets clamped by diode 450 at a diode voltage drop above the voltage of input 315.

Although the discussion above mentions 52V for an input voltage and 39V for a zener voltage, other embodiments are possible using a wide range of input voltages and zener voltage values.

Figure 5:
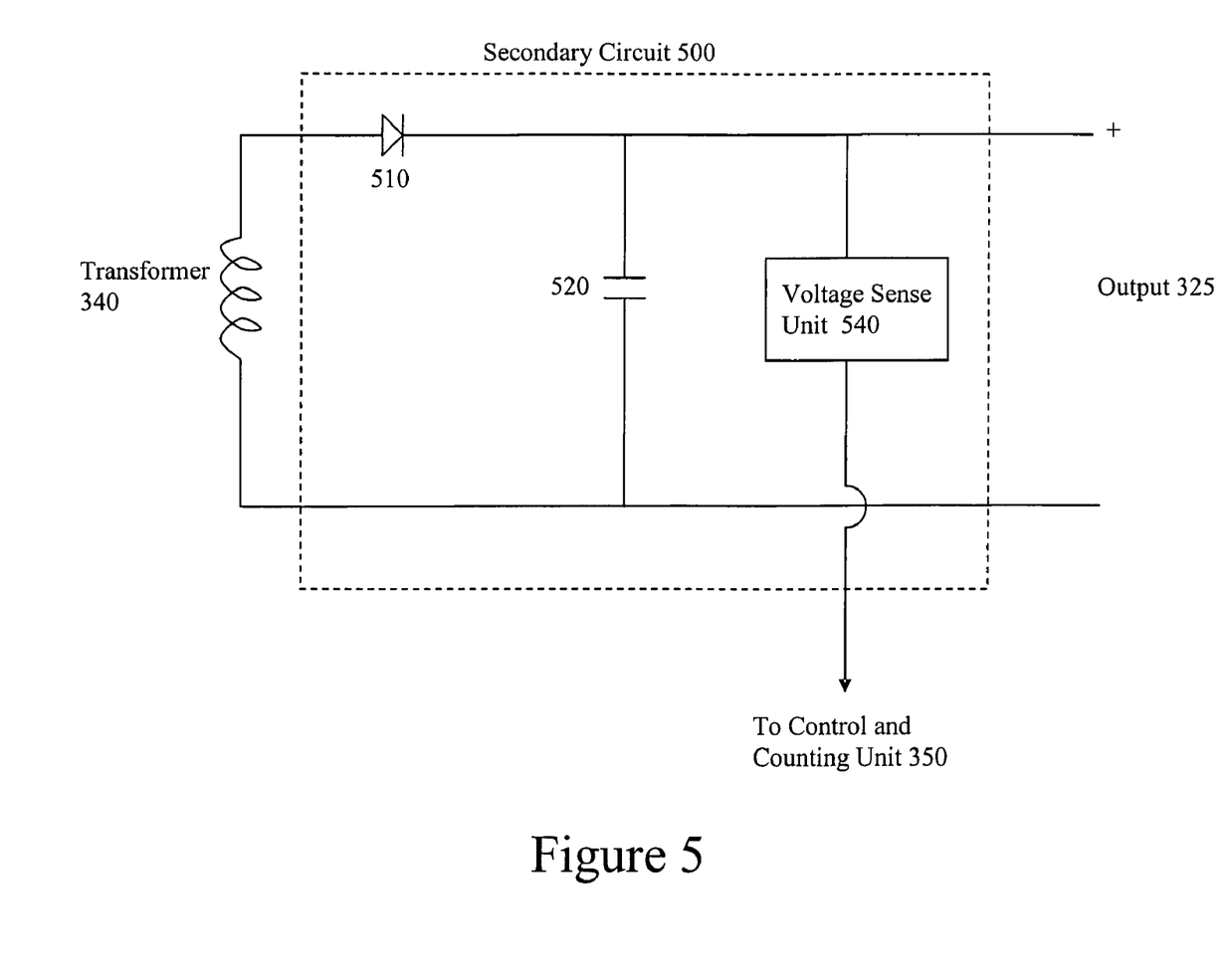
FIG. 5 is a block diagram of an embodiment of an example secondary circuit that may be used in connection with the example embodiment of FIG. 3.

FIG. 5 is a block diagram of an embodiment of an example secondary circuit 500 that may be used in connection with the example embodiment of FIG. 3. Secondary circuit 500 includes a diode 510 and a capacitor 520. Secondary circuit 500 also includes a voltage sense unit 540 coupled to output 325.

When switches 410 and 420 are on, current flows through the primary side of transformer 340 and energy is stored in the transformer. When switches 410 and 420 are off, the stored energy is transferred out into secondary circuit 500 via the secondary windings of transformer 340. The polarity of the windings and the orientation of diode 510 are chosen to substantially block conduction of current in the secondary windings when switches 410 and 420 are on.

For this example embodiment, switch 410 is controlled by control and counting unit 350. Control and counting unit 350 operates according to a periodic clock. For this example, the clock has a fixed frequency. Also for this example embodiment, for every clock period a determination is made by control and counting unit 350 as to whether to assert the primary enable signal 401 to switch 410. Further for this example embodiment, the clock may be operated at a fixed frequency and whenever a determination is made to enable switch 410, primary enable signal 401 is asserted for predetermined period of time, resulting in a predetermined "on time" for switches 410 and 420.

The determination as to whether to enable switch 410 is based at least in part on the voltage sensed by voltage sense unit 540. For one embodiment, the voltage may be measured relative to ground. Other embodiments may sense the difference between the positive and negative nodes of output 325. If voltage sense unit 540 detects a voltage that is below a reference voltage level, then control and counting unit 350 can enable switch 410 for the next clock period. Similarly, if voltage sense unit 540 detects a voltage that is greater than the reference voltage level, then control and counting unit 350 does not enable switch 410 for the next clock period. Therefore, for heavier loads at a secondary circuit output, switch 410 is enabled more often. Switch 410 is enabled less often for lighter loads.

For this embodiment, power supply 300 is operated in discontinuous conduction mode, which means that the energy stored in transformer 340 has been substantially reduced to zero before the next energy cycle, generally resulting in the secondary current reaching zero before the next cycle.

If power supply 300 is operated in discontinuous conduction mode, and if voltage regulation is accomplished on a whole-cycle basis, and if the primary switch 410 is operated at a fixed on time, and given a predetermined input voltage, then the amount of energy delivered to the secondary circuits can be determined by counting the number of clock periods during which switch 410 is enabled over a period of time.

Although the example embodiments discussed above describe one secondary circuit coupled to the primary circuit via a transformer and not additional secondary circuits, other embodiments are possible that use more than one secondary circuit. For embodiments that use two or more secondary circuits, the overall power consumption may be measured using a single counter, or switches may be implemented into the secondary circuits allowing one secondary to be turned on while the others are turned off. In this case, one or more counters can track the number of primary switch enablings corresponding to each selected secondary. Control and counting unit 350 may control which of the secondary circuits are enabled at a given time. Control and counting unit 350 may include a counter for each of the secondary circuits. In this manner, control and counting unit 350 can maintain separate counts corresponding to each of the secondary circuits.

Control and counting unit 350 may also include one or more registers to store count information. It is also possible to include a number of additional counters and timers for performing measurements over various periods of time or for more than one secondary circuit.

As discussed previously, although the embodiments described herein use one or more counters to count the number of times a primary switch is enabled over a period of time, other embodiments are possible where a timer is used to determine how long it takes for a predetermined number of primary switch enablings to occur.

Power supply circuit 300 may be implemented into a larger system, perhaps as part of an image forming device such as a printer. The system may include a processor that can access the count registers and perform calculations to determine various aspects of power delivery.

Although the embodiments discussed herein mention operation in discontinuous conduction mode, other embodiments are possible using continuous conduction mode, although the calculations to determine the amount of power delivered over a period of time may be more involved than is the case with discontinuous conduction mode.

Further, although the power supply circuit 300 is based on a flyback topology, other embodiments are possible using other arrangements including, but not limited to, buck or boost.

The embodiments described above have the capability of being able to perform measurements continuously and quickly. This may be useful in image forming devices such as ink printers. However, the embodiments described herein are not limited to ink printers. The embodiments described herein may be implemented in a wide range of electronic devices.

Other embodiments are possible where the above mentioned measurement techniques could be used to implement a programmable power limit into the power supply. One embodiment may allow a predetermined, programmable amount of energy to be delivered to an output during a predetermined, programmable window of time, not allowing delivery of energy at other times, effectively limiting the average power delivered by the supply. Because the limit is programmable, the limit can be changed dynamically as system conditions warrant.

Figure 6:
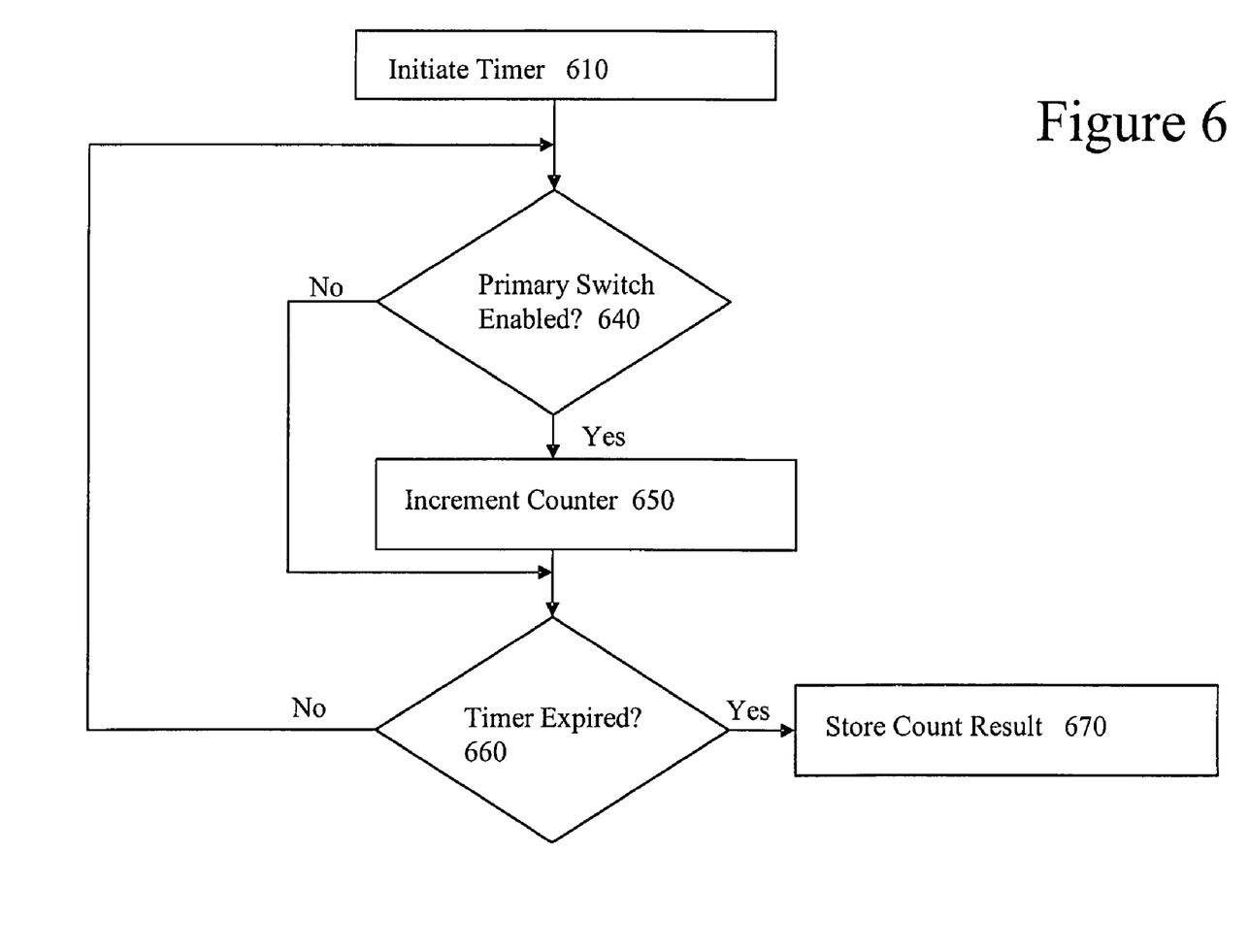
FIG. 6 is a flow diagram of one embodiment of a method for measuring power consumption.

FIG. 6 is a flow diagram of one embodiment of a method for measuring power consumption. At block 610, a timer is initiated. A counter may also be reset. A determination is made at block 640 as to whether a primary switch is enabled, thereby allowing power transfer from a primary circuit to a secondary circuit. If the switch is enabled, then at block 650 a counter is incremented. If the switch is not enabled, then the counter is not incremented. The determination as to whether or not the switch is enabled may be carried out on a clocked basis. Further, the timer period may be a multiple of the decision clock period. At block 660 a check is made to see if the timer has expired. If the timer has expired, then the count value is stored in a register or other storage location for later retrieval. If the timer has not yet expired, then processing returns to block 640.

Figure 7:
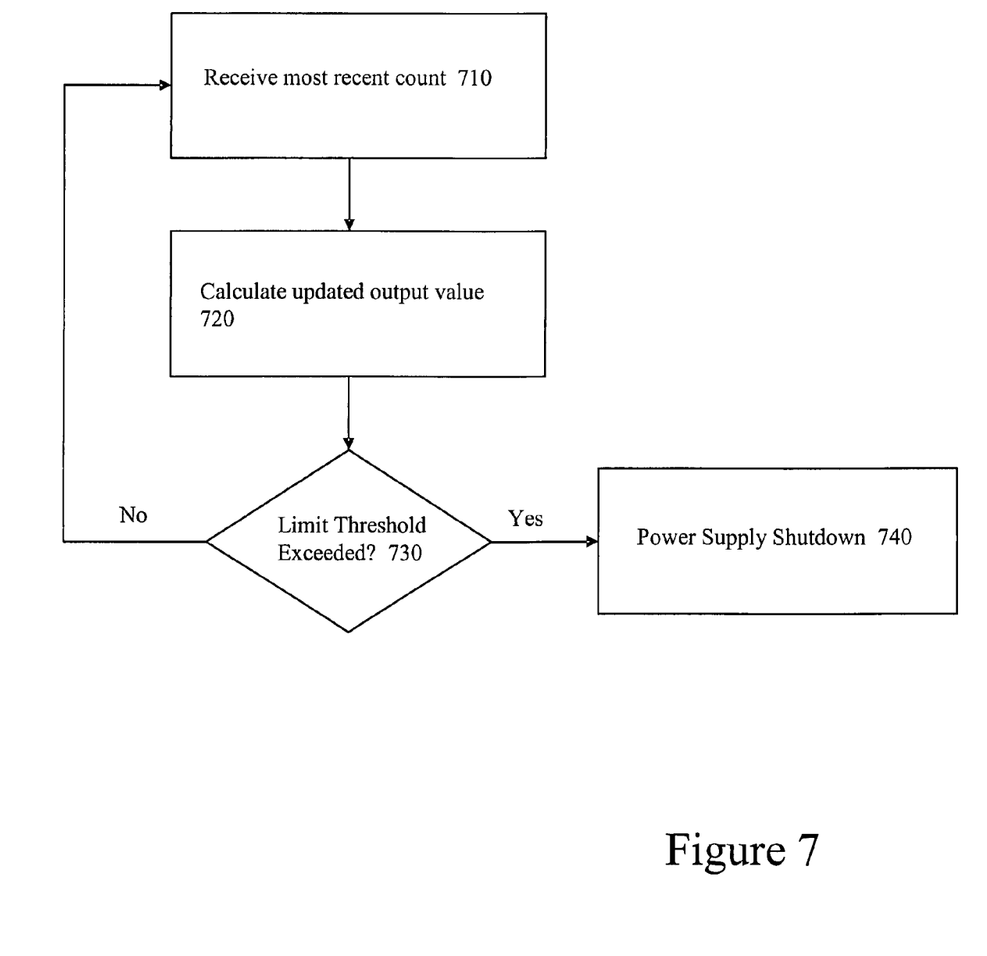
FIG. 7 is a flow diagram of one embodiment of a method for filtering a count value.

FIG. 7 is a flow diagram of one embodiment of a method for filtering count values. Such a method may be implemented into units such as filter unit 130 of FIG. 1, or counter and filter unit 230 of FIG. 2, or control and counting unit 350 of FIG. 3. At block 710, a most recent count value is received. At block 720 an updated output value is calculated. The updated output value is compared with a limit threshold at block 730. If the updated output value exceeds the limit threshold, then at block 740 a power supply is shutdown. Otherwise, processing returns back to block 710 where a new count value is received. In this manner, a variety of filter functions may be performed. The possible filter functions may include maintaining a running average of count values, where the running average is compared with the threshold value. Any of a wide range of methods for calculating the average may be used. An operation such as the IIR filter discussed above in connection with FIG. 2 may also be performed. Any short term changes in power consumption will be smoothed out over time. Further, although this example embodiment describes shutting down a power supply, other embodiments are possible where the filter output values are used for other purposes.

Figure 8:
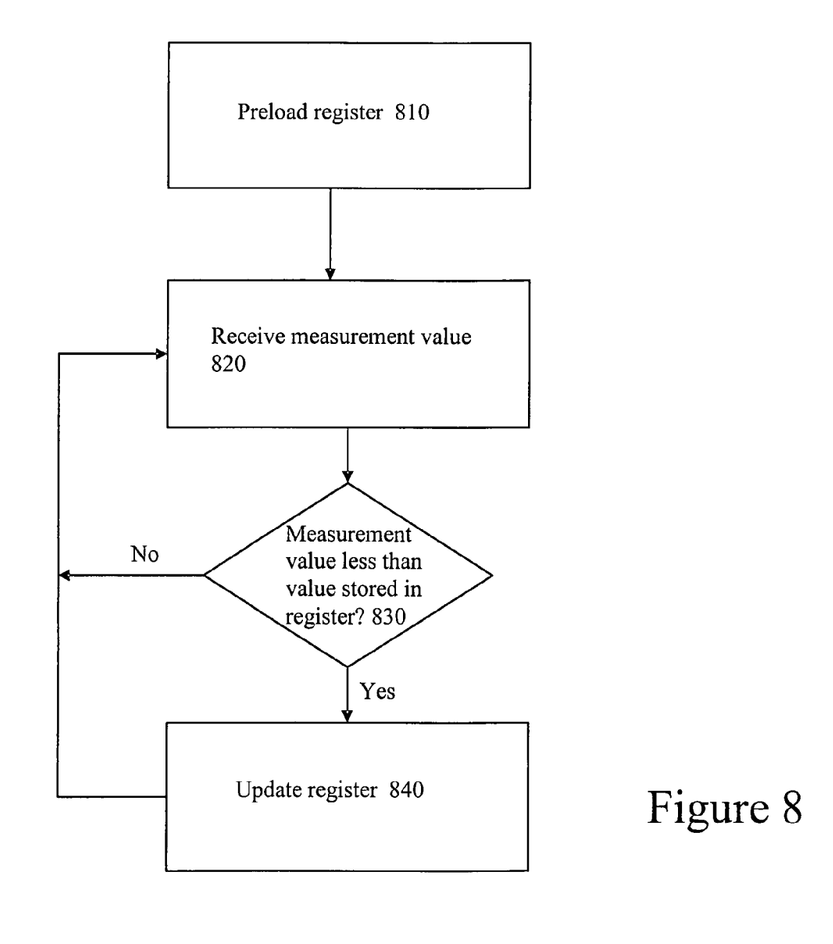
FIG. 8 is a flow diagram of one embodiment of a method for determining a lowest power measurement value occurring during a time period.

FIG. 8 is a flow diagram of one embodiment of a method for determining a lowest power measurement value occurring during a period of time. Such a method may be implemented into units such as filter unit 130 of FIG. 1, or counter and filter unit 230 of FIG. 2, or control and counting unit 350 of FIG. 3. At block 810, a register is preloaded with a value. For this embodiment, the preloaded value may be a high value. At block 820, a measurement value is received. The measurement value may be a count value indicating a number of primary switch enablings. The measurement value may also be some other value representing an amount of power transfer through a power supply. At block 830, a determination is made as to whether the received measurement value is less than the value currently stored in the register, which at this point is the preloaded value. If the recently received value is less than the value in the register, then the register is updated with the recently received measurement value. If the recently received measurement value is not less than the value stored in the register, then processing returns to block 820 where another measurement value is received. In this manner, the most recent measurement values are continuously checked to see if they are less in value than the value stored in the register.

The register may be read at any time by a processor or other circuitry to determine the lowest measured power consumption occurring over a period of time. This can be advantageous in situations where a limited amount of time is available to perform measurements since no synchronization between firmware or other software agent and the hardware is performed to make this determination. For example, in a printer engine that uses a drum and ink pens, the drum may rotate about once every second. The pens may be turned off for a period not exceeding approximately six milliseconds in this example. It may be desirable to measure the power being consumed while the pens are off. Using the example method of FIG. 8, the register can be preloaded at any point before the pens are turned off, and the hardware can make continuous measurements. The register may be read after the pens are turned back on in order to determine the lowest measurement of power consumed while the pens were off.

For this example embodiment, measurements may be taken at three millisecond intervals so that at least one measurement period occurs entirely during the pen off period, which for this example is six milliseconds. If the measurement period was greater than three milliseconds for this example, then it would not be assured that a measurement period would occur entirely within the pen off period. For example, if the measurement period was set to four milliseconds and the measurement did not begin until three milliseconds into the six millisecond pen off period, then the measurement would not complete until after the pens had been turned back on, and an inaccurate lowest power consumption measurement during a period of time would be the result.

Figure 9:
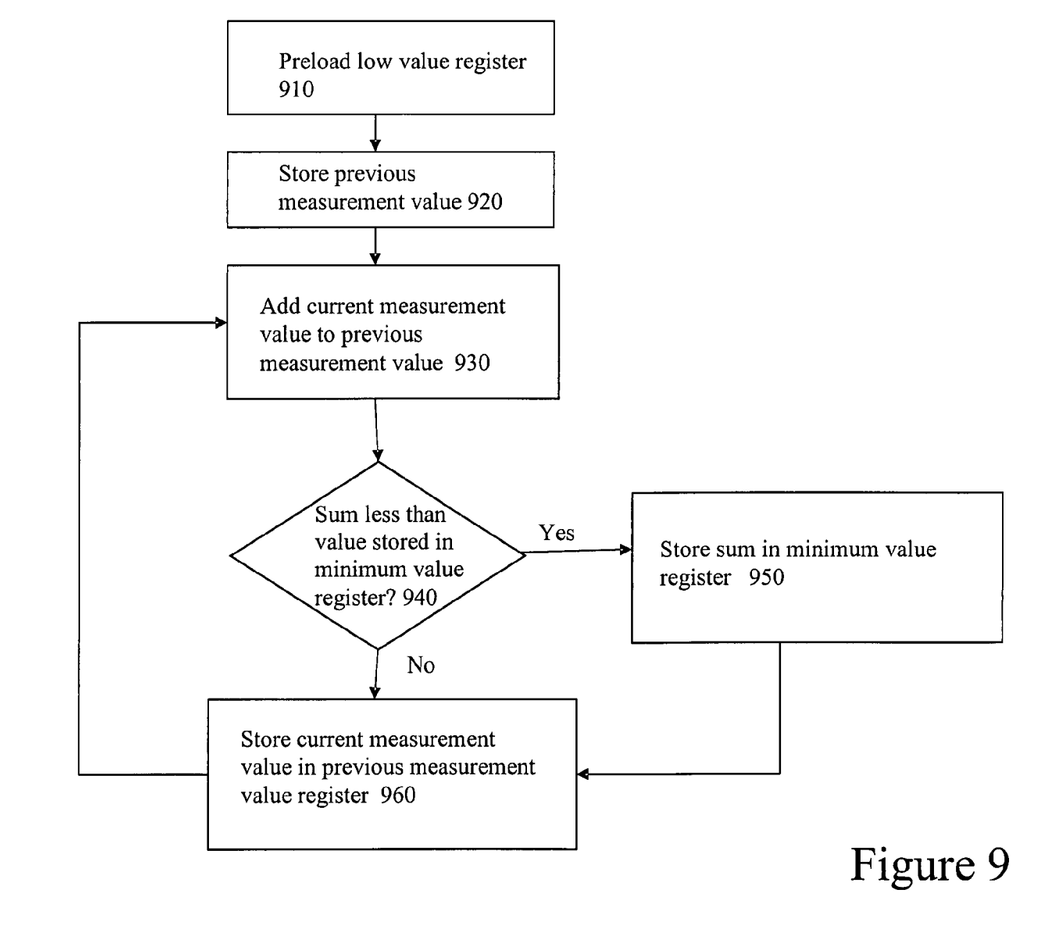
FIG. 9 is a flow diagram of one embodiment of a method for combining the results of two measurement intervals.

FIG. 9 is a flow diagram of one embodiment of a method for combining the results of two measurement intervals. This example embodiment may be used to increase the resolution of measurements similar to those discussed above in connection with FIG. 8. In the embodiment of FIG. 8, a three millisecond measurement period was chosen so that the measurement period fit entirely within the six millisecond pen off period. For this example method, two or more shorter measurement periods can be combined to increase measurement resolution. For example, two two millisecond measurement periods can be selected to occur within the pen off period and can be combined to produce what is in effect a four millisecond measurement period rather than the three millisecond period described above in connection with FIG. 8.

At block 910, a value is preloaded into a low value register. The value for this example may be a high value. At block 920, a previous measurement value is stored in a previous measurement value register. At block 930, a current measurement value is added to the previous measurement value. A determination is made at block 940 as to whether the sum of the previous and current measurement values is less than the value in the low value register. If the sum is less than the value already stored in the low value register, then at block 950 the sum of the previous and current measurement values replaces the value in the low value register. Then, at block 960, the current measurement value is stored in the previous measurement value register and processing returns back to block 930 where another measurement takes place and the process continues.

Although this example embodiment discusses using two measurement periods that fall within a measurement window, other embodiments may use more than two measurement periods. Further, although embodiments are discussed that use two or three millisecond measurement periods within six millisecond measurement windows, many other embodiments are possible using other measurement periods and measurement windows.

In addition to the various filter functions described above in connection with the various figures, other embodiments are possible that perform other filter functions, including, but not limited to, determining a rate of change for power consumption and determining a power consumption value during a period of time.

Figure 10:
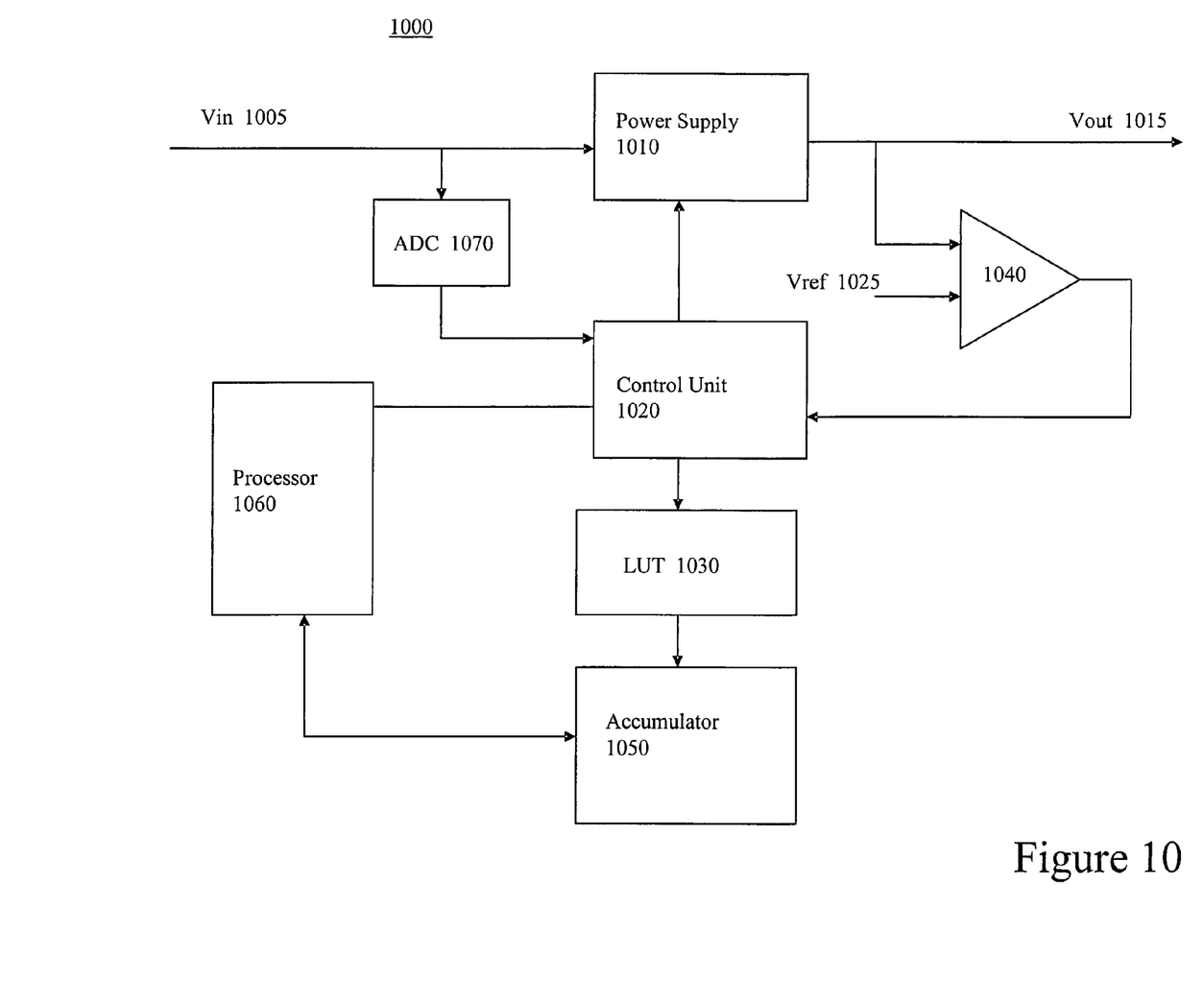
FIG. 10 is a block diagram of on embodiment of an example system including a look-up table and an accumulator.

FIG. 10 is a block diagram of an embodiment of an example system 1000 including a look-up table 1030 and an accumulator 1050. This example system 1000 includes a power supply 1010 which may be similar to the power supply discussed above in connection with FIGS. 1, 2, and 3. System 1000 includes a control unit 1020 coupled to power supply 1010 and comparator 1040. Control unit 1020 determines when to enable power supply 1010 based on information received from comparator 1040 in this example embodiment. System 1000 also includes an analog-to-digital converter (ADC) 1070 that samples the input voltage. ADC 1070 provides input voltage information to the control unit 1020.

Also coupled to the control unit 1020 is a look-up table (LUT) 1030. LUT 1030 may include a multidimensional array of entries representing power measurement values. For this example embodiment, in response to each enabling of power supply 1010, control unit 1020 may access a value in LUT 1030. Control unit 1020 may use a range of possible indices to access power measurement values. Possible indices include counter values, input voltage, primary switch on-times, temperature, etc. LUT 1030 may provide accessed values to an accumulator 1050. For this embodiment, accumulator 1050 may add together values provided by LUT 1030. Accumulator 1050 may include an accumulation result register. The accumulation results may represent an amount of power transferred by power supply 1010 over a period of time. Accumulator 1050 may be periodically accessed by processor 1060. In this example embodiment, accumulator 1050 is reset whenever accessed by processor 1060 in preparation for the next measurement period. A reset of accumulator 1050 may occur in response to a read of the accumulation result register.

The values included in LUT 1030 may be determined and programmed during a calibration mode using a load of a predetermined size after the power supply 1010 is operating at a desired output voltage.

Although the use of a multidimensional array of LUT values is discussed herein, another embodiment may use primary switch on-times as the index into the LUT 1030 without using other parameters to access LUT 1030. A value based on the on-time may be delivered to accumulator 1050 every operating cycle. Possible on-times include 0, 0.5, 0.75, 1.0, 1.25, and 1.5 microseconds. For this and for other example embodiments discussed herein, LUT 1030 may store values in a fixed point binary format. Other registers described herein may also store values in a fixed point binary format.

Further, although the current example embodiment discusses a particular arrangement of system components, other embodiments are possible using a wide range of system configurations.

The LUT functions described above may be combined with various hardware or software algorithms. One such algorithm may interpolate between different entries in the LUT. Other embodiments may dispense with the LUT altogether and use hardware or software algorithms to produce similar results.

In another embodiment, the accumulator 1050 may include additional circuitry to perform filter functions. The range of possible filter functions includes, but is not limited to, all of the filter functions discussed above in connection with other embodiments.

Reference in the specification to "an embodiment," "one embodiment," "some embodiments," or "other embodiments" means that a particular feature, structure, or characteristic described in connection with the embodiments is included in at least some embodiments, but may or may not be included in all embodiments. The various appearances of "an embodiment," "one embodiment," or "some embodiments" may or may not be all referring to the same embodiments.

In the foregoing specification the claimed subject matter has been described with reference to specific example embodiments thereof. It will, however, be evident that various modifications and changes may be made thereto without departing from the broader spirit and scope of the subject matter as set forth in the appended claims. The specification and drawings are, accordingly, to be regarded in an illustrative rather than in a restrictive sense.

What is claimed is:

1. An apparatus, comprising:
   a power supply circuit;
   a counter to count the number of times of enabling the power supply circuit; and
     a filter circuit to receive a count value from the counter, wherein the power supply circuit includes a primary circuit and a secondary circuit, the primary circuit including a primary switch, wherein the counter is configured to count a number of clock periods where the primary switch is turned on over a period of time and wherein the apparatus further comprises:
   a control unit configured to receive information from the secondary circuit and to control operation of the primary switch according to information received from the secondary circuit; and
   a look-up table including a plurality of entries containing information relating to power measurement values, the control unit being configured to use a count value from the counter as an index into the look-up table.

2. The apparatus of claim 1, wherein the filter circuit receives a plurality of count values from the counter and further wherein the filter circuit performs a filter function on the plurality of count values.

3. The apparatus of claim 2, wherein the filter circuit performs a finite impulse response filter function on the plurality of count values.

4. The apparatus of claim 3, wherein the finite impulse response filter function includes determining an average of the plurality of count values.

5. The apparatus of claim 2, wherein the filter circuit performs an infinite impulse response filter function on the plurality of count values.

6. The apparatus of claim 2, wherein the filter circuit includes a configuration to shut down the power supply circuit if a result value of the filter function exceeds a threshold value.

7. The apparatus of claim 1, further comprising a processor to receive a filter function output from the filter circuit.

8. The apparatus of claim 1 further comprising an accumulator configured to periodically receive measurement information from the look-up table.

9. The apparatus of claim 8, wherein the control unit uses primary switch on-times as an index into the look-up table.

10. The apparatus of claim 8, wherein the control unit uses input voltage as an index into the look-up table.

11. The apparatus of claim 8, wherein the accumulator resets upon a read of the accumulation result register.

12. The apparatus of claim 1, wherein the power supply circuit operates in a discontinuous conduction mode.

13. The apparatus of claim 1, wherein the power supply circuit is configured to supply power for a substantially constant on period of time each enabling.

14. The apparatus of claim 1, wherein the count value is proportional to an actual amount of power transferred by the power supply circuit.

15. A method, comprising:
   receiving a plurality of count values from a counter coupled to a power supply of an electronic device, the count values indicating a number of times of enabling the power supply;
   performing a filter function on the plurality of count values; and
   modifying operation of the device using output from the filter function.

16. The method of claim 15, wherein performing a filter function includes performing a finite impulse response filter function.

17. The method of claim 15, wherein performing a filter function includes performing an infinite impulse response filter function.

18. The method of claim 15, further comprising comparing a result of the filter function with a limit threshold and signaling a power supply shutdown if a filter function output value exceeds the limit threshold.

19. The method of claim 15 further comprising:
   preloading a register with a predetermined value;
   receiving a first power measurement value, wherein the first power measurement value is based at least in part on the count value; and
   updating the register.

20. The method of claim 19 further comprising:
   receiving a subsequent power measurement value; and
   updating the register with the subsequent power measurement value if the subsequent power measurement value is less than the value stored in the register.

21. The method of claim 19, wherein preloading a register with a predetermined value includes preloading a low value register, and further comprising storing the first power measurement value in a power measurement value register, and further comprising adding a second power measurement value to the first power measurement value, and further comprising storing the sum of the first and second power measurement values in the low value register if the sum is less than the value previously stored in the low value register.

22. The method of claim 21 further comprising replacing the first power measurement value with the second power measurement value in the power measurement value register.

23. The method of claim 22 further comprising:
   adding a third power measurement value to the value stored in the power measurement value register; and
   storing the sum of the third power measurement value and the value stored in the power measurement value register in the low value register if the sum is less than the value previously stored in the low value register.

24. A machine-readable medium containing instructions that when executed perform a method, comprising:
   receiving a plurality of count values from a counter coupled to a power supply of an electronic device, the count values indicating a number of times of enabling the power supply;
   performing a filter function on the plurality of count values; and
   modifying operation of the device using output from the filter function.

25. The machine-readable medium of claim 24, wherein performing a filter function includes performing a finite impulse response filter function.

26. The machine-readable medium of claim 24, wherein performing a filter function includes performing an infinite impulse response filter function.

27. The machine-readable medium of claim 26, further comprising comparing a result of the filter function with a limit threshold and signaling a power supply shutdown if a filter function output value exceeds the limit threshold.

28. An apparatus, comprising:
 means for supplying power;
 means for counting the number of times of enabling the means for supplying power; and
 means for performing a filter function on one or more count values received from the means for counting;
 a register to store a first measurement value based at least partially on a count value received from the counter;
 a low value register; and
  circuitry to add a subsequent measurement value to the first measurement value and to compare the resulting sum with a value stored in the low value register.

29. The apparatus of claim 28, wherein the counter is configured to perform a subsequent count of the number of times that the power supply is enabled and wherein the register is configured to store a subsequent measurement value if a subsequent measurement based at least partially on the subsequent count produces a result that is less than the first measurement value.

30. The apparatus of claim 28, wherein the sum of the subsequent measurement value and the first measurement value are stored in the low value register if the sum is less than the value stored in the low value register.

31. An apparatus, comprising:
 a power supply circuit;
 a counter to count the number of times of enabling the power supply circuit; and
  a filter circuit to receive a count value from the counter, wherein the filter circuit receives a plurality of count values from the counter, wherein the filter circuit performs a filter function on the plurality of count values and wherein the filter circuit includes a configuration to shut down the power supply circuit if a result value of the filter function exceeds a threshold value.

32. An apparatus, comprising:
 means for supplying power;
 means for counting the number of times of enabling the means for supplying power; and
  means for performing a filter function on one or more count values received from the means for counting; and
 a register to store a first measurement value based at least partially on a count value received from the counter, wherein the counter is configured to perform a subsequent count of the number of times that the power supply is enabled and wherein the register is configured to store a subsequent measurement value if a subsequent measurement based at least partially on the subsequent count produces a result that is less than the first measurement value.

* * * * *